US006407753B1

(12) United States Patent
Budinsky et al.

(10) Patent No.: US 6,407,753 B1
(45) Date of Patent: Jun. 18, 2002

(54) SYSTEM AND METHOD FOR INTEGRATING ENTITIES VIA USER-INTERACTIVE RULE-BASED MATCHING AND DIFFERENCE RECONCILIATION

(75) Inventors: Frank J. Budinsky, Newmarket; Steven R. Dobson, Mississauga, both of (CA); Matthew Kaplan, New York, NY (US); Vincent J. Kruskal, Harrison, NY (US); Harold L. Ossher, South Salem, NY (US); Peri L. Tarr, Northampton, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/304,606

(22) Filed: May 4, 1999

(51) Int. Cl.[7] .............................. G06F 3/14; G06F 11/36
(52) U.S. Cl. ........................ 345/764; 345/704; 345/967; 717/125; 717/113; 717/127; 707/101; 706/60; 706/59
(58) Field of Search ................................. 345/764, 704, 345/700, 966, 967, 762, 763, 780, 809; 707/500.1, 101, 102, 103 Y, 104.1; 717/1, 4, 100, 110, 113, 124–127, 131; 706/59, 45, 60, 61

(56) References Cited

U.S. PATENT DOCUMENTS

| | | | | |
|---|---|---|---|---|
| 5,546,505 A | * | 8/1996 | Austvold et al. | 706/60 X |
| 5,619,685 A | | 4/1997 | Schiavone | 703/20 |
| 5,812,122 A | * | 9/1998 | Ng | 345/762 X |
| 5,873,094 A | * | 2/1999 | Talatik | 707/104.1 |
| 5,883,639 A | * | 3/1999 | Walton et al. | 345/764 X |
| 6,044,219 A | * | 3/2000 | Lips | 717/4 |
| 6,112,312 A | * | 8/2000 | Parker et al. | 717/4 X |

OTHER PUBLICATIONS

Ossher, et al., "Specifying Subject–Oriented Composition", Theory and Practice of Object Systems, vol. 2, #3, pp. 179–202, Wiley, 1996.

* cited by examiner

Primary Examiner—Raymond J. Bayerl
(74) Attorney, Agent, or Firm—F. Chau & Associates, LLP

(57) ABSTRACT

A system and method for integrating entities using a graphic user interface (GUI) to provide user-interactive rule-based matching and difference reconciliation. In one aspect, a system for integrating entities employs a combination of default matching and reconciliation approaches and user tailoring to generate a composite entity from one or more input entities using a set of composition rules. The set of composition rules comprises a combination of default rules, as well as rules that represent user interactions that are performed via a graphical user interface when the user edits a composite result. The rules are captured and then stored persistently when the user requests that the composition be saved, such that the rules may be retrieved during a subsequent editing session associated with the same inputs. If the inputs change, the integration process (as specified by the rules) can automatically handle many changes. It is only when changed elements of the input are, or need to be, subject to specific rules that additional tailoring may be required.

29 Claims, 6 Drawing Sheets

SYSTEM AND METHOD FOR INTEGRATING ENTITIES VIA USER-INTERACTIVE RULE-BASED MATCHING AND DIFFERENCE RECONCILIATION

BACKGROUND

1. Technical Field

The present invention relates generally to software development tools and, more particularly, to a system and method for integrating entities using a graphical user interface (GUI) to provide user-interactive rule-based matching and difference reconciliation.

2. Description of Related Art

Typically, during software development, there are many situations where entities (e.g., objects, messages, or data) must be integrated, even though their detailed content is different (e.g. different data fields, types, aggregations, etc.). For example, during the development of object-oriented applications, common base classes may be factored out by analyzing the input classes to find "matching" data and methods which can be combined and then moved to the base class. Composite objects are formed by aggregating one or more input (component) classes that are exposed through a "combined" interface of the composite. Moreover, in messaging systems, multiple messages from different sources might have to be combined to form a single, integrated message.

Entities typically consist of many elements. When integrating entities, some elements of the entities to be integrated might match (i.e., they represent the same thing in the different representations) while others might not. The matching criteria used for integrating entities can vary greatly, ranging from simple element-name matching, to more complicated scenarios in which syntactically different input entities may actually represent the same thing. Once matching elements of the input entities have been identified, any differences between them must be reconciled, and then these reconciled elements are integrated to form the composite entity.

A similar, and even more common, situation for integrating entities is where entities must be shared by, or passed between, applications, but where the different applications have different expectations regarding the detailed content of such entities. This process is referred to by various names, depending on the nature of the entities involved. For example, if the entities are objects that communicate through interfaces, this process called "interface mapping" or application program interface (API) mapping. If the entities are messages or data, the process is called "message mapping" and "data mapping," respectively. In these cases, integration is required not to produce a composite, but to map inputs to outputs. Indeed, the growing popularity of XML (Extensible Markup Language) as an interchange form has brought this issue to the forefront: XML dictates a common format, but not common content. Consequently, the integration of content elements is critical to realizing free interchange.

Conventionally, the process of integrating entities typically comprises two steps. The first step of the integration process typically involves examining the definitions of the entities to be integrated, and determining which of their elements match and how their differences can be reconciled. The second step of the integration process involves the execution of the integration in accordance with the determination made in the first step, which involves, for example, actually calling functions, or building integrated messages or data from actual input messages or data.

The first and second steps of the integration process typically occur at different times, referred to herein as "development-time" and "run-time," respectively. "Development-time" refers to the time when the first step of the integration process is performed. For example, in the case of message integration, the first step occurs when developers examine definitions of messages that must be integrated, while a system is being developed or modified. On the other hand, the second step of the integration process typically occurs during "run-time," (e.g., in the case of message integration, the time when actual messages are being sent and received). It is to be understood, however, that there are cases where "development-time" and "run-time" occur simultaneously. For example, if integration were used in a programming environment to help factor out base classes, as described above, the resulting base classes will actually be produced right after the user specifies how to do so.

Conventionally, the "development-time" task of matching common definitions of elements, reconciling their differences and determining how to produce an integrated result is generally a manual operation with very little, if any, tool support. For example, some existing development-time matching software tools are limited in that they only display and help users visualize the input elements while the user matches and reconciles each input element, one by one (i.e., user tailoring), but do not support mechanisms for performing automatic matching of elements.

In addition, other conventional software tools (or builders) that are used for software development, in general (e.g., building UML (Unified Modeling Language) designs), provide a combination of automatic processing when possible, as well as user tailoring. These systems, however, may be configured such that all or some of the information resulting from user tailoring is lost when the tool is run again, which is known in the art as the "round-trip" problem. The diagram of FIG. 2A illustrates a general approach utilized by some conventional software builder tools. With a conventional software tool, the result (denoted by "R"), which is generated by processing input components $1_1$ and $1_2$, for example, is typically stored persistently, when the user is satisfied with the result. Although the result R is derived from processing the input components, it is nevertheless treated like an unrelated entity. Consequently, if the input components comprising the result R are slightly modified requiring some minor editing of the result R, the previous result must be analyzed in order to determine how the result R was derived from the inputs and what user tailoring was performed to obtain the result, which is difficult and sometimes virtually impossible. Alternatively, a new result can be produced by processing the modified inputs using the tool, discarding the previous result (including all the work the user put in to producing it), which is burdensome to the user.

Accordingly, there is a need for a software development system and method which supports both automatic and user guided rule-based matching and reconciliation for integrating one or more entities, whereby the matching/reconciliation rules are stored such that they can be recalled and applied during a subsequent editing session when the input entities change or a new composite entity of the inputs is desired.

SUMMARY OF THE INVENTION

The present invention is directed to a system and method for integrating entities using a graphical user interface (GUI)

to provide user-interactive rule-based matching and difference reconciliation.

In one aspect of the present invention, a system for integrating entities employs a combination of default matching and reconciliation approaches and user tailoring to generate a composite entity from one or more input entities using a set of composition rules. The set of composition rules comprises a combination of default rules, as well as rules that represent user interactions that are performed via a graphical user interface when the user edits a composite result. The rules are captured and then stored persistently when the user requests that the composition be saved, such that the rules may be retrieved during a subsequent editing session associated with the same inputs. If the inputs change, the integration process (as specified by the rules) can automatically handle many changes. It is only when changed elements of the input are, or need to be, subject to specific rules that additional tailoring may be required.

In another aspect, the GUI is configured such that when a user selects a result element, the GUI will highlight the input elements that were integrated to form the selected result element. Similarly, when the user selects an input element, the GUI will highlight each result element it contributes to.

In another aspect, the user can select some specific inputs, and specify that they should match, or specify that matched elements should not be matched.

In another aspect, a dependency mechanism is employed to track which specific result elements are affected by a recorded rule in the rule set, as well as the manner in which the rule affects such result elements, such that the dependency information can be used to automatically disable earlier rules which conflict with subsequent rules, and allow the user to manually disable undesired rules. In particular, the dependency mechanism supports multi-level undo/redo and the direct manipulation of the rules (i.e. user actions). For example, an explicit rule that the user may have applied, such as deleting an element from the result, could be undone by simply removing the "delete rule" from the rule set. This includes, for example, either performing an "undo" operation or selecting the specific "delete rule" from the set and indicating that it should be removed.

These and other aspects, features and advantages of the present invention will be described and become apparent from the following detailed description of preferred embodiments, which is to be read in connection with the accompanying drawings.

DETAILED DESCRIPTION OF PREFERRED EMBODIMENTS

It is to be understood that the present invention may be implemented in various forms of hardware, software, firmware, special purpose processors, or a combination thereof. Preferably, the present invention is implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

Figure 1:
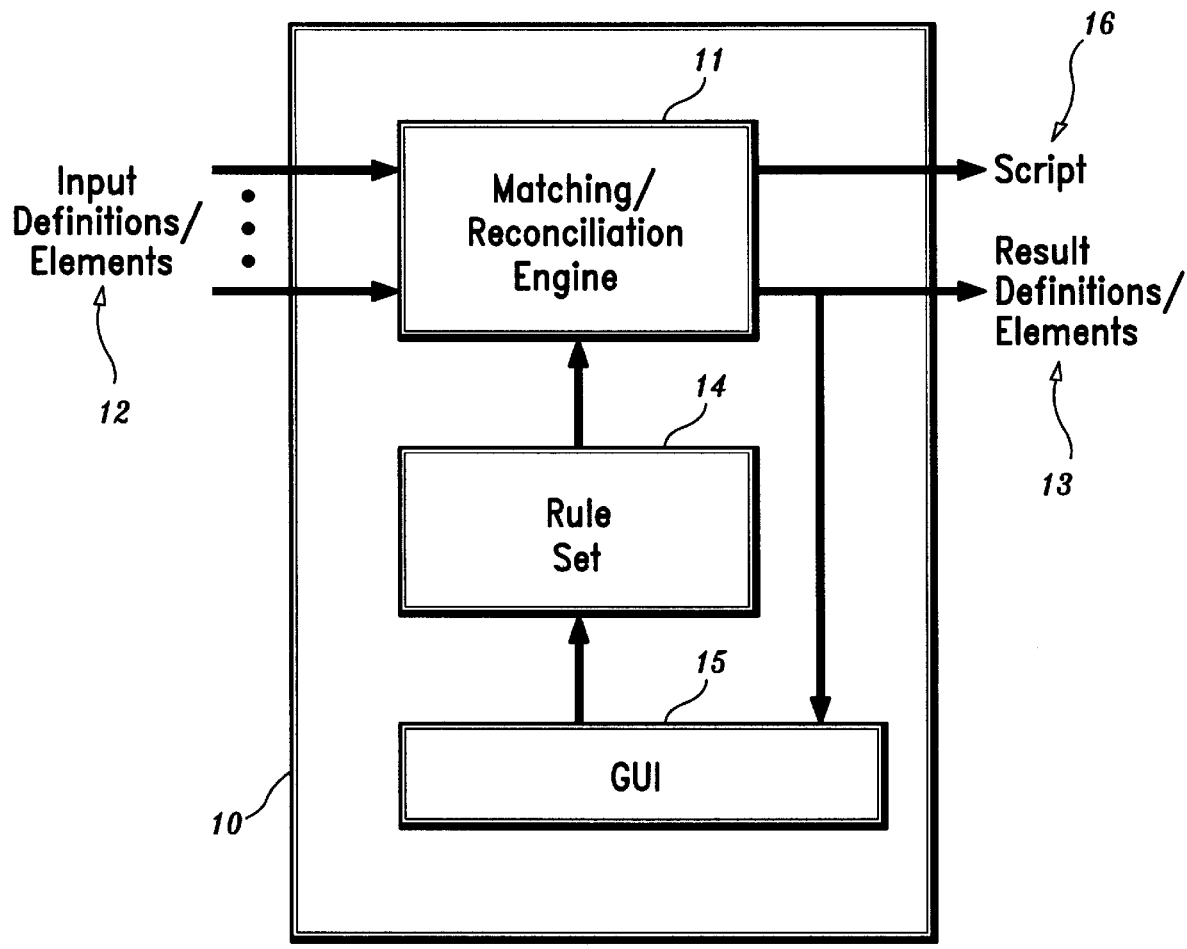
FIG. 1 is a block diagram of a system for integrating entities in accordance with an embodiment of the present invention.

Referring now to FIG. 1, a block diagram illustrates a system for integrating entities in accordance with an embodiment of the present invention. The system 10 includes a matching/reconciliation (MR) engine 11 which, during development-time (or "editing session"), receives as input one or more input definitions 12, where each input definition 12 describes a type of element comprising an entity. The MR engine 11 then generates result definitions 13 which, for example, describe element types of a composite entity. It is to be understood that the MR engine 11 may be configured to receive and process actual run-time elements of one or more input entities to produce output elements of the composite entity. As such, the term "element" may be used herein to collectively refer to both run-time elements and development-time definitions of elements.

The MR engine 11 will generate the result definitions 13 for given input definitions 12 by applying a corresponding rule set 14 comprising one or more matching and reconciliation (composition) rules, which specify the manner by which to combine the elements of the input entities and, in some instances, reconcile the differences. The basic underlying theory of the composition rules and the manner in which they are applied by the MR engine 11 is described in detail in "Specifying Subject-Oriented Composition" by H. Ossher, et al., Theory and Practice of Object Systems, Vol. 2 #3, pp. 179–202, Wiley, 1996, which is fully incorporated herein by reference. The result definitions 13, as well as the input definitions 12, are displayed using a proprietary GUI 15, which may be configured based on the type of application in which the present invention is employed.

As explained in further detail below, during each editing session, a rule set 14 is recorded and associated with a given set of inputs. Specifically, default matching and reconciliation may be initially performed automatically by the MR engine 11 using rules defining a default overall composition style (algorithm) selected by the user via the GUI 15. The result definitions 13 (produced by applying the default rules) is then displayed to the user using the GUI 15, which shows both the inputs and the result produced. If the user is not satisfied with the result 13 that is generated using the initial default rules (composition style), the user can tailor the result 13 by performing one or more interactions via the GUI 15. Such user-interactions include, for example, selecting a different default matching and reconciliation method (either for the entire output result or for selected parts of it), specifying a particular match between desired input elements which were not initially matched by the MR engine 11, retracting a match that was found by the MR engine 11, adding desired elements to, or deleting desired elements from, the displayed result 13, renaming elements in the displayed result 13, and/or specifying certain transformations that are needed to reconcile input elements.

Figure 7:
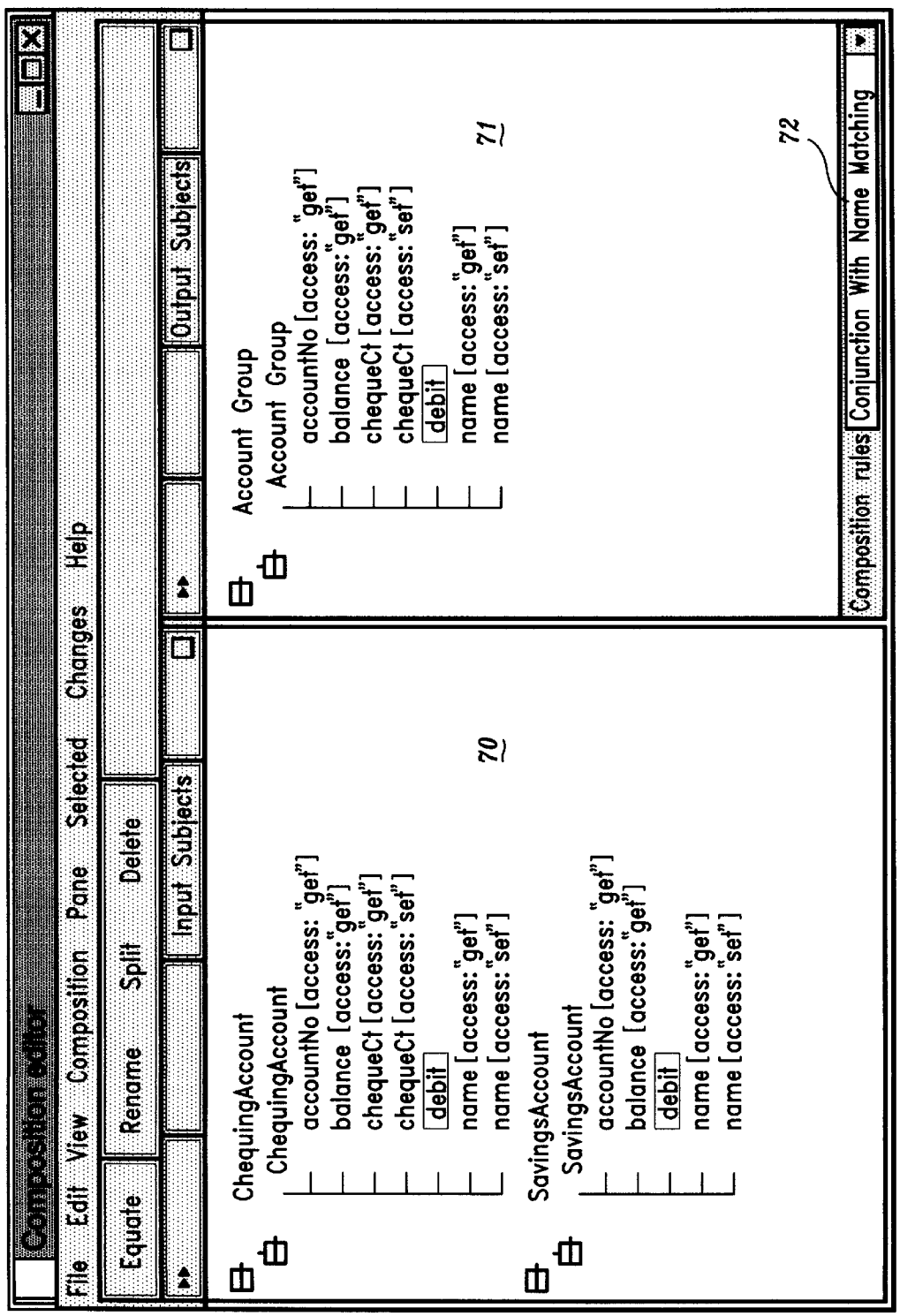
FIG. 7 is an exemplary graphical user interface which may be employed for integrating entities in accordance with one aspect of the present invention.

Referring now to FIG. 7, a diagram illustrates an exemplary GUI which may be employed for integrating entities in accordance with one aspect of the present invention. It is to be understood that the GUI of FIG. 7 is presented for illustrative purposes only and that the present invention may be implemented in any computer programming environment or data processing system (e.g., object-oriented and database applications) in which integration or composition of entities is desired. It is to be further understood that such applications may employ one or more GUI's that are suitable for the corresponding application. The GUI of FIG. 7 is illustrative of a GUI which may be employed in a system configured for generating composite business objects, such as International Business Machines' (IBM) WebSphere™ system. The WebSphere™ system is a middleware product that can be used to design, develop and deploy distributed object-oriented (O-O) applications implementing "business" objects, for example. Business objects are O-O objects (in C++ code, for example) which comprise methods that are suitable for business applications (e.g, "Employee" "Customer", "Account" objects). The present invention may be employed in this system to assist a user to automatically implement an interface of a desired composite object in terms of the interfaces of the component objects without having to manually generate the code for the composite object from scratch.

As shown in FIG. 7, the illustrative GUI comprises and "input panel" 70 for displaying one or more input business objects (e.g., Checking Account and Savings Account) which are selected by a user for integration. The illustrative GUI may also include a "composition rules" item selection field 72 which allows the user to select a desired overall default composition style (i.e., default matching algorithms). Moreover, the illustrative GUI comprises an "output panel" 71 for displaying the result composite business object (e.g., Account Group) (which is synthesized from the input objects). The user can select and highlight an element in the result (e.g., by pointing and clicking with the mouse), and the input element(s) that were integrated to form the selected output element are highlighted also. This is illustrated in FIG. 7 with regard to the "debit" method. Similarly, the user can select an input element, and the GUI will highlight all output elements into which the selected input element was integrated.

The user can refine the output result by interactively editing the displayed elements. For example, as shown, the illustrative GUI includes functions such as "Equate", "Rename", "Split" and "Delete". The "Equate" function may be utilized to combine (match) input elements of the input objects that were not combined using the default composition rules. This is performed by highlighting desired elements of the input objects and selecting the equate function, and the output object will be updated accordingly. In addition, the "split" function may be utilized to unmatch elements that were combined. This is performed by highlighting the desired output element and selecting the "split" function. In addition, certain elements may be deleted or renamed by highlighting desired elements and selecting the "delete" and "Rename" function, respectively.

It is to be appreciated that during the editing session, notwithstanding that each user-interaction appears to be directly editing or modifying the output result 13, what is actually occurring is that each user interaction is changing the underlying composition that is used by the MR engine 11 to derive the output result definitions 13 from the input definitions 12. In particular, for each user interaction, a composition rule or set of composition rules is recorded and stored in the rule set 14 for the given inputs 12. Each recorded rule is associated with its corresponding result element(s) so as to remember which elements the rules refer to.

Figure 2A:
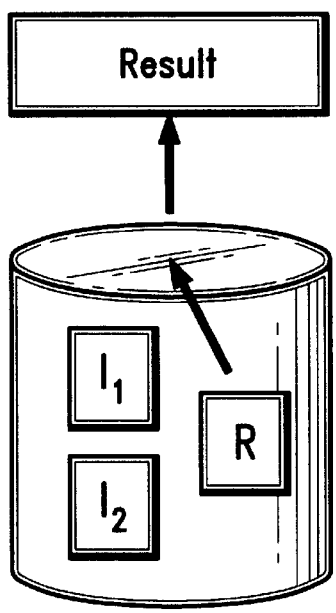
FIG. 2A is a general block diagram illustrating a process for producing a composite result in accordance with the prior art.
Figure 2B:
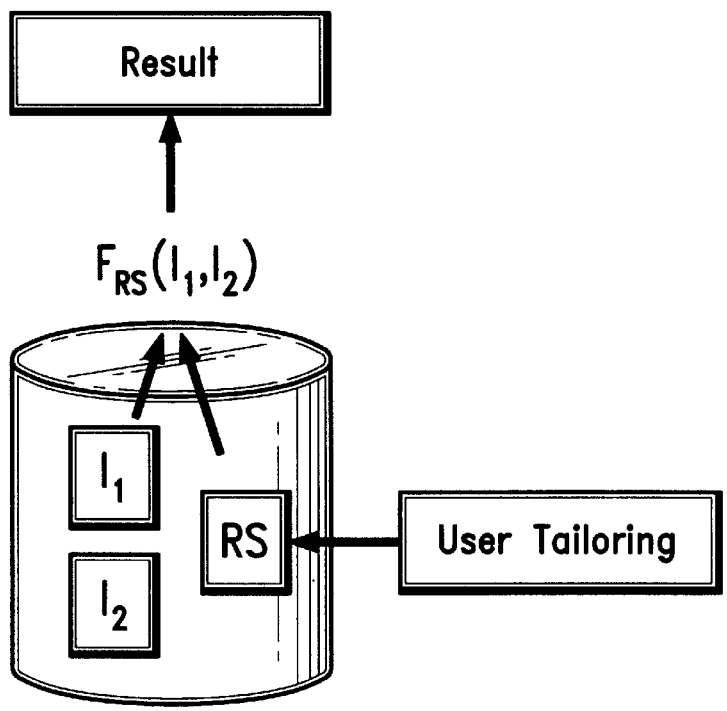
FIG. 2B is a block diagram illustrating a process for producing a composite result in accordance with one aspect of the present invention.

The process of generating and recording a rule (or set of rules) for each user-interaction during the editing process provides a significant advantage over the prior art method which, as described above with reference to FIG. 2A, saves the result rather than rules used to generate the result. Advantageously, in accordance with the present invention, the composition rules that are generated and recorded during an editing session are applied to the inputs whenever the result is required. FIG. 2B illustrates the approach used in accordance with the present invention, whereby the set of rules (RS) that are generated in accordance with user tailoring are stored (rather than the result). These rules represent the transformation function ($F_{RS}$) that is applied by the MR engine 11 to transform the inputs to produce the required result. Rather than capturing the end result, the present invention is employed to capture the information representing the relationship between the result and the original inputs. Because the result is in fact a function of the matched inputs, it is advantageous to maintain the transformation function rather than the result itself, especially when iterative matching is required. Advantageously, by saving rules instead of the result, the set of rules can be applied to altered and/or additional inputs. This approach ensures that, even when the inputs change, a result is produced for the user to examine and tailor. In many cases, it is likely to be correct, or close to correct. This is primarily because the present invention employs (as described in further detail below) default matching and reconciliation mechanisms that, when applied to the modified inputs, can automatically handle many of the input changes. It is only when changed parts of the inputs are, or need to be, subject to specific rules, that additional tailoring is needed. This is in contrast to the systems (e.g., builders) that employ combinations of automatic processing and user tailoring, but lose all, or part of, the user tailoring if inputs change; this is known as the "round-trip" problem. The approach of the present invention mitigates (or eliminates) the "round-trip" problem, by applying the previously saved rules during a subsequent editing session of the same inputs (i.e. the same file with modified input elements) to produce the desired result, or at least provides a better starting point from which to begin further tailoring.

As explained above, during an editing session, the user may perform many interactions, each of which specifies one or more new rules to be added to the rule set. Consequently, later recorded rules might conflict in some way with earlier recorded rules. In such cases, the later rules should prevail. To accomplish this, the present invention advantageously employs a dependency mechanism in the rule set 14 which tracks how each recorded rule (in the corresponding rule set) affects a particular result definition 13, or a set of result definitions, and in what particular way. For example, a given rule might change the name of a definition, or set some particular attribute to a particular value. In this manner, before executing a particular rule, the MR Engine 11 can analyze the dependencies among the rules to determine whether any later rule in the rule set affects the same result definition(s) in a related way (e.g., also changing the name, or setting the same attribute). If so, the earlier rule is automatically disabled.

This approach to determining inter-rule dependencies and disabling rules has other important advantages. For example, the well-known function "Undo" may be implemented by disabling the last currently-enabled rule. A different flag value may be used to record the manner in which a given rule is disabled. For instance, one flag value may be used to indicate a rule that is disabled by the "undo" function, whereas another flag value may be used to indicate an earlier contradicting rule that has been disabled automatically. In addition, the function "Redo" may be implemented by enabling the last rule that was disabled by the "Undo" function. It is to be further appreciated that the GUI 15 can be configured to display the current rule set, with disabled rules indicated (and differentiated by the corresponding flag values). This feature allows the user to explicitly disable or enable individual rules (except that automatically disabled rules cannot be manually enabled, because they would just end up being disabled again by the process above). This is a more flexible approach to the "undo" function (than is common) which is realizable due to the fact that rules can be related to explicitly affected result definitions, and all dependencies between rules can be determined on this basis. Another advantage is that disabled rules can be removed from the rule set. This reduces the size of the rule set and improves the efficiency of the MR Engine 11 (although the undo/redo capability is lost with respect to the removed rules).

As explained above, when an editing session is complete and the user exits, the rule set 14 is saved, along with some information about the inputs 12. When the user initiates another session to, e.g., edit the result for the unchanged inputs or edit the result, if needed, to compensate for changes in the input, the user can restore the previously recorded rule set to reapply the rules to the inputs. If the details of the inputs did not change in the interim, the result definition 13 will be the same. If the inputs did change, however, some of the details of the rules in the rule set may be incorrect or not applicable. For instance, one or more rules might refer to elements in the inputs that no longer exist. If so, the system may be configured to automatically remove such references from the rules. If a rule no longer has any effect, the system may be configured to automatically disable the rule. In addition, certain rules may refer to existing elements, but may be no longer be correct. In this instance, the user will determine whether certain rules are incorrect. It is to be appreciated that regardless of the change in the input, the previous rules may be applied (unless of course the user desires to begin a new rule set by initially applying the default composition rules) and the result presented to the user, who can make changes by further interactions that add more rules, and/or by manually disabling some rules.

Figure 3:
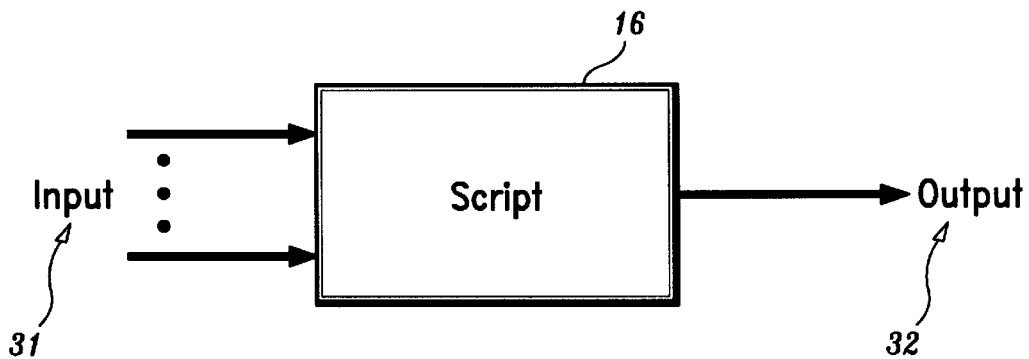
FIG. 3 is a diagram illustrating a run-time process for integrating entities, which may be implemented in connection with the present invention.

After an editing session that results in result definitions 13 that are satisfactory to the user, the user can request generation of the script 16, which is generated by the MR engine 11. The script 16 may be a program or a piece of program that, when executed at run time, will perform the integration (produce the result) determined by the user. As shown in FIG. 3, the script 16 accepts inputs 31 and integrates them to produce output 32. The inputs must all conform to the input definitions 12 so that the output 32 will conform to the result definition 13 (FIG. 1).

Figure 4:
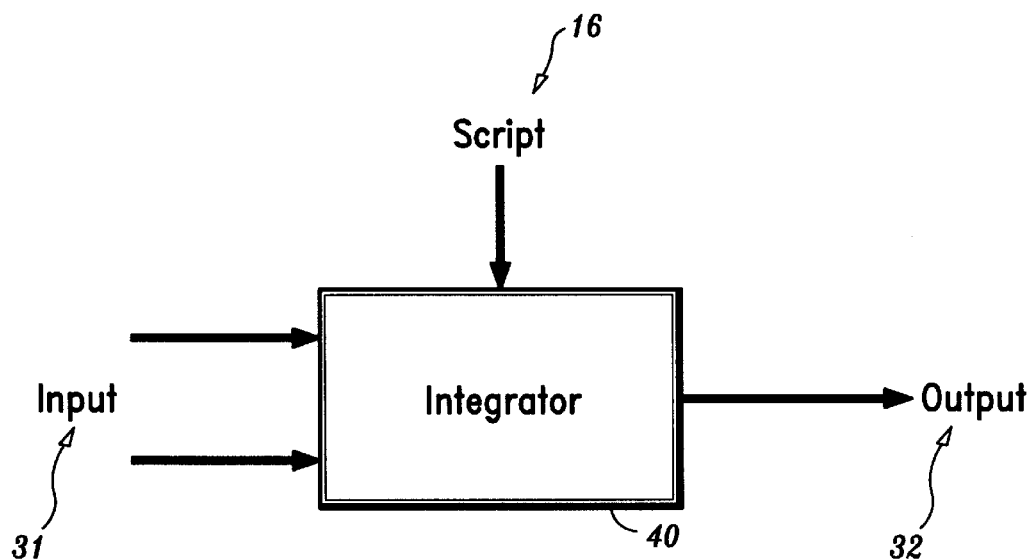
FIG. 4 is a diagram illustrating another run-time process for integrating entities, which may be implemented in connection with the present invention.

Alternatively, referring to FIG. 4, the script 16 can be data (tables) that are used by an integrator 40 at run time to perform the integration. At run time, the integrator 40 accepts a number of inputs 31 and the script 16, and produces an output 32. Again, if the inputs 31 all conform to the input definitions 12, that the output 32 will conform to the result definition 13.

Figure 5:
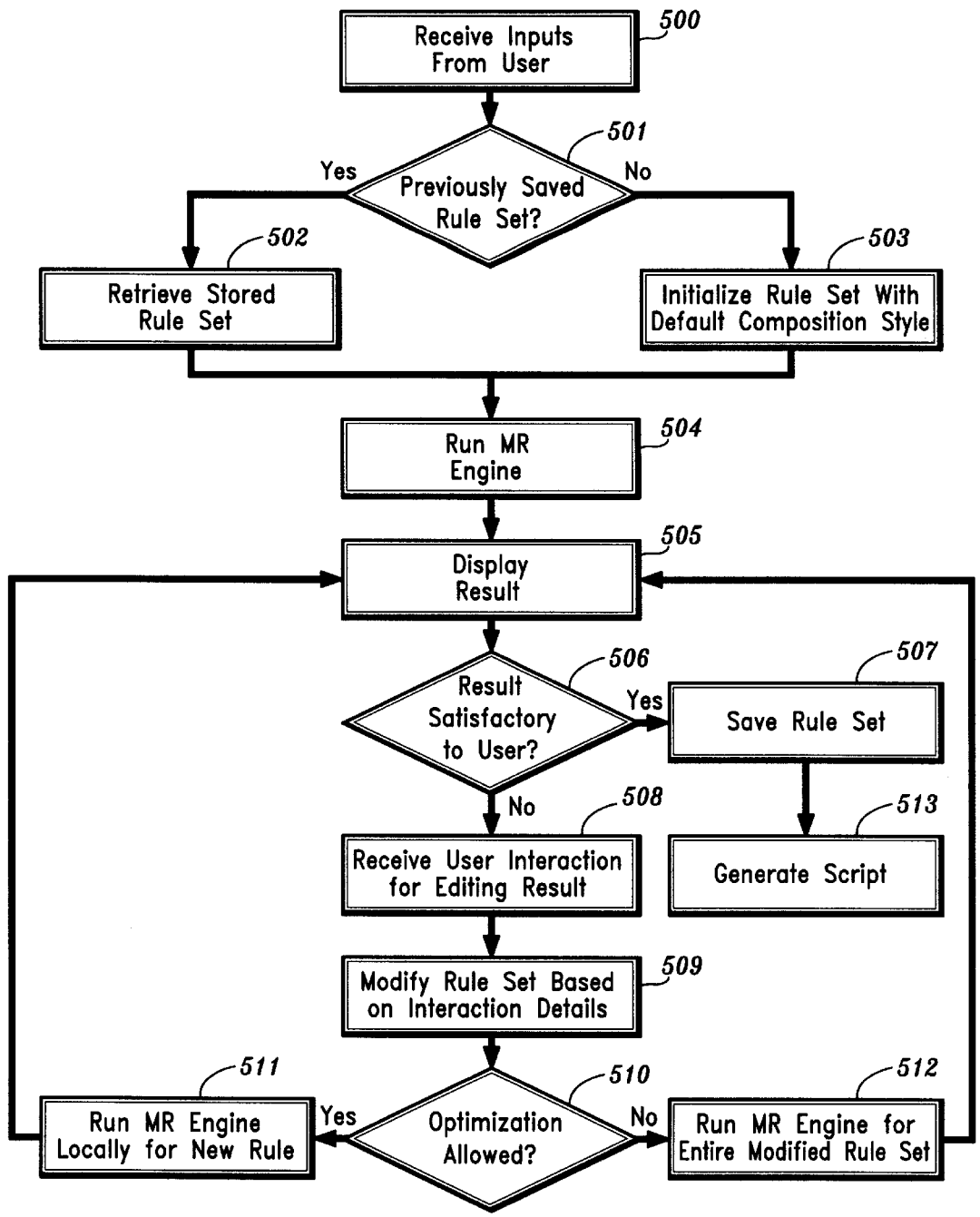
FIG. 5 is a flow diagram illustrating a method for integrating entities in accordance with one aspect of the present invention.

Referring now to FIG. 5, a flow diagram illustrates a method for integrating entities in accordance with one aspect of the present invention. It is to be understood that the method of FIG. 5 illustrates an editing session that the user performs during "development time" to generate a script for integrating one or more entities (i.e., generating a script for mapping one or more inputs to an output result). Initially, the system will receive one or more inputs from the user (step 500), where each input represents an entity. As indicated above, each input comprises either definitions that describe elements of a given entity, or the actual run-time elements of a given entity. If the user desires to continue a previous MR editing session for the given inputs using a previously saved rule set (affirmative decision in step 501), the stored rule set may be retrieved from memory (step 502). If there is no previously stored rule set (or if the user wants to generate a new rule set) for the given inputs (negative decision in step 501), the rule set with the default composition style will be initialized (step 503).

When the desired initial rule set has been selected by the user, the MR engine will apply the selected rule set to the inputs (step 504) and the result will be output (e.g., displayed) (step 505). If the user is satisfied with the output result (affirmative result in step 506), the user will select a quit request to end the editing session and the rule set for the given inputs will be saved (step 507), and a script will be generated (step 513). If, on the other hand, the user is not satisfied with the result (negative result in step 506), the user can proceed to edit the output result through a user interaction (step 508). As stated above, the user interaction may include, for example, selecting a different default matching and reconciliation method (either for the entire output result or for selected parts of it), specifying a match between input elements that were not matched by the MR engine using the currently existing rules, retracting a match that was found by the MR engine, adding elements to or deleting elements from the result, renaming elements in the result, and/or specifying transformations needed to reconcile input elements. Each user interaction (which edits the output result) specifies one or more new rules which are added to the rule set to produce a modified rule set (step 509). As noted above, the user perceives this process as editing the output result, but underneath it is actually creating and refining the set of MR rules needed to produce the required result.

For each user interaction which generates a rule (or rules) that is added to the rule set, a determination is made (based on the rule) as to whether an optimization process can be applied (step 510). This determination is made in accordance with predetermined criteria based on the type of rule(s) generated and the affect of the rule(s) on the entire rule set. For instance, if the user interaction is a request to apply a different default composition style to the input elements, such a change would have such a profound impact on the output that the entire rule set would be reprocessed by the MR engine 11. On the other hand, a request to rename an output element may not have such a profound affect on other rules and output elements so that it may be executed locally. Therefore, if optimization is allowed (affirmative determination in step 510), the MR engine can operate locally for the new rule, whereby the rule is executed incrementally to update the existing result definition (step 511) and then display the modified result (step 505). If optimization is not allowed (negative determination in step 510), then the MR engine will execute the entire rule set (step 512) and then the modified result is displayed (step 505). Advantageously, optimization provides the same result with greater efficiency.

Figure 6:
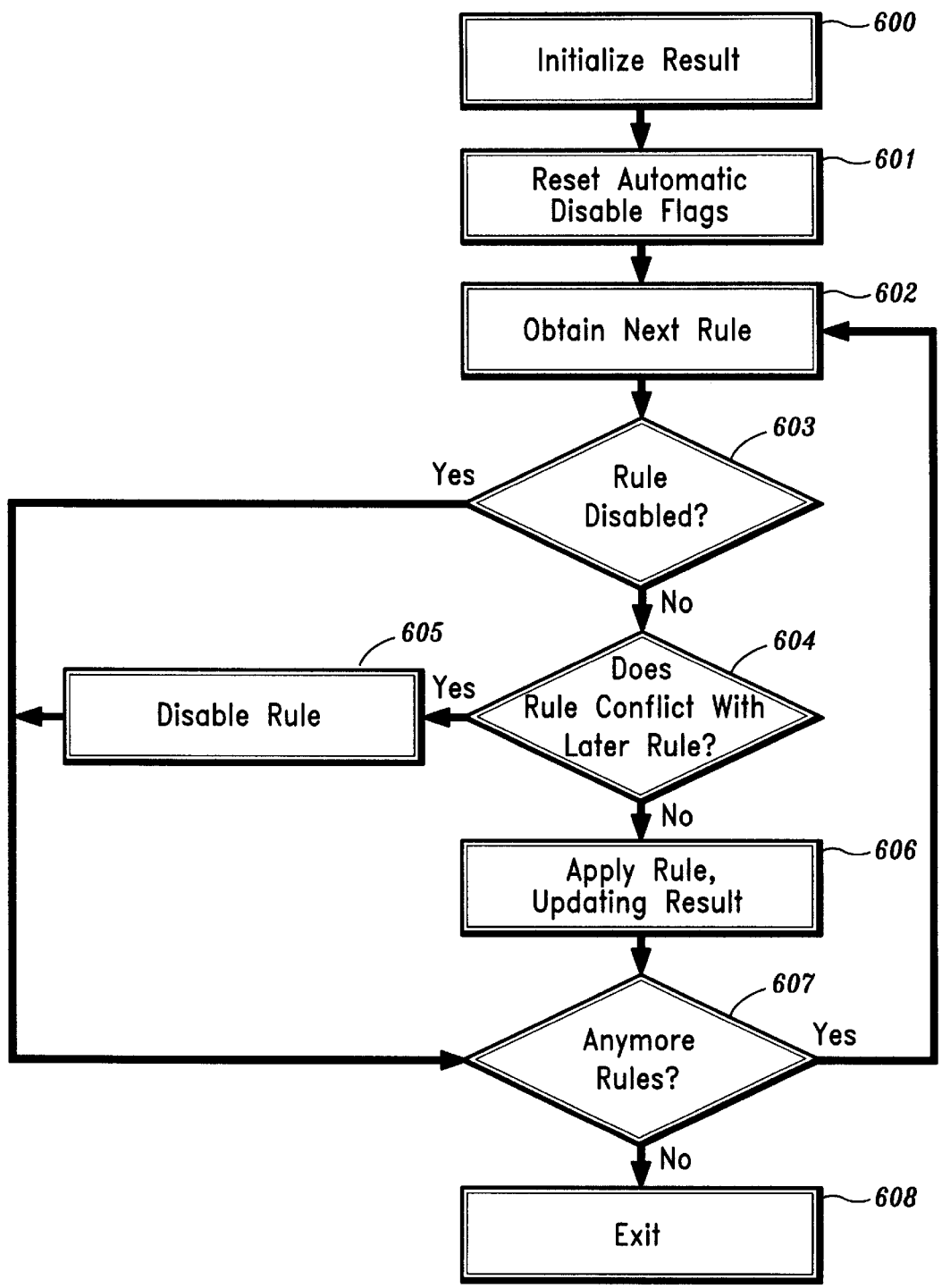
FIG. 6 is a flow diagram illustrating a method of operation of the matching/reconciliation engine of FIG. 1.

Referring now to FIG. 6, a flow diagram illustrates a method of operation of the MR engine (step 504 and 512, FIG. 5) in accordance with one aspect of the present invention. As noted above, the MR engine operates to match and reconcile the inputs by executing each rule (in the set of rules) in sequence each time the result needs to be generated or displayed. Initially, the MR engine 11 will initialize the result (step 600), and reset all flag values that correspond to rules that have been automatically disabled (step 601). This is to ensure that any rules that have been automatically disabled due to conflicts with subsequent rules, for example, are enabled in the event the subsequent conflicting rules have been disabled in the interim. The MR engine 11 then selects the initial rule in the rule set to begin generating the result (step 602). A determination is then made as to whether the selected rule is disabled (step 603), for example, by either an "Undo" operation manually selected by the user, or manually disabled by the user upon viewing the rule set. If the rule is determined to be disabled (affirmative determination in step 603), a determination is made as to whether the current rule set contains any more unprocessed rules (step 607). If so, the next rule will be selected for processing (return to step 602).

If, on the other hand, the selected rule is not disabled (negative determination in step 603), a determination is made as to whether the selected rule conflicts with a later rule in the rule set (step 604). In particular, when the MR engine is about to execute a rule, it will check the dependencies among the rules to determine whether any later rule in the rule set affects the same result definition(s) in a related way (e.g., also changing the name, or setting the same attribute). If so, the current rule is automatically disabled (step 605) and a determination is then made as to whether the current rule set contains any more unprocessed rules (step 607). If so, the next rule will be selected for processing (return to step 602).

If, on the other hand, the selected rule does not conflict with a later rule (affirmative result in step 604), the selected rule will be executed and the result updated (step 606). This process is continued for all rules in the rule set until all rules have been processed, at which time the result will be displayed.

It is to be appreciated that the present invention may be employed to match different types of content common to different sets of inputs, whereas other matching tools are engineered to be specific to one type of input content, for example, matching of text files. Advantageously, the present invention is adaptable to matching, reconciliation and integration of other types of content, such as the XML situation noted above. The MR engine can easily be adapted to apply to a variety of different content types. New types of MR rules can also be easily added. On the other hand, the user interface for each matching type would have to be somewhat modified, in order to properly reflect the user's model of the contents being matched for the purposes of combining, mapping, or translating the contents of the inputs. However, the basic design of user interaction with a user interface, which shows the results of a default match and the application of a set of rules, in order to add, remove, or modify rules in the persistent rules set, remains the same. The GUI code is well separated from the MR code, allowing GUI modifications to be made without affecting the core system.

It is to be understood that the present invention is not restricted to the specific process of integrating entities as described above and that one of ordinary skill in the art can envision a variety of different software development tools that may be configured in accordance with the teachings herein. In particular, the MR engine of FIG. 1 may be considered, in general, as a builder engine which receives an input comprising one or more elements (depending on the type of application) to generate desired output elements (in accordance with the application type) using a set of rules that are configured for processing the particular elements of the desired application and generated (in part) based on user-interactive editing performed via a GUI suitable for the given application. For example, with object-oriented design, UML (Unified Modeling Language) may be used for graphically designing an object-oriented system (e.g., graphically designing classes, methods, instance variable, hierarchical structures of classes, etc). In this situation, the builder engine may import either existing code (e.g. a C++ file) or a description or representation of an initial graphical diagram (e.g., XMI (XML Metadata Interchange)) and generate a diagram which is displayed via the GUI for user-interactive editing. In accordance with the present invention, such user interactions can be represented by rules which are stored persistently. If the initial code or XMI is modified, the user can advantageously have the stored rules (from the prior editing session) applied to the modified input to thereby produce a result which can tailor is necessary.

Although illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for generating a result entity, comprising the steps of:

receiving as input at least one input entity;

automatically transforming the at least one input entity to a result entity;

displaying the at least one input entity and the result entity;

editing the displayed result entity by accepting at least one user command, if the result entity is not satisfactory to the user, wherein the input entity comprises input elements and the result entity comprises output elements;

selecting, by the user, at least one element of the displayed result entity; and automatically indicating at least one element of the at least one input entity that corresponds to the at least one element selected by the user.

2. The method of claim 1, wherein the step of automatically transforming the at least one input entity comprises the step of applying a rule set having at least one composition rule to transform the at least one input entity to the result entity; and wherein the step of editing the displayed result entity comprises the steps of modifying the rule set based on the at least one user command, and generating and displaying an edited result entity by applying the modified rule set to the at least one input entity.

3. The method of claim 2, further comprising the steps of:
repeating the editing step until the edited result entity is satisfactory to the user; and
saving to memory the modified rule set and associating it with the at least one input entity.

4. The method of claim 3, further comprising the steps of:
retrieving from memory the modified rule set;
applying the modified rule set to a modified version of the at least one input entity;
automatically disabling any rule in the modified rule set that is rendered ineffective due to the modified version of the at least one input entity.

5. The method of claim 2, wherein the step of modifying the rule set comprises the steps of:
generating at least one composition rule representing the at least one user command; and
incorporating the at least one generated composition rule into the rule set.

6. The method of claim 2, wherein the step of applying a rule set comprises the step of one of retrieving a previously stored rule set and selecting a default rule set.

7. The method of claim 2, wherein the step of applying the rule set comprises the steps of:
determining if the rule set includes any disabled rules; and
ignoring the disabled rules during the transform process.

8. The method of claim 2, wherein the step of applying the rule set comprises the steps of:
determining if the rule set includes at least one group of conflicting rules; and
automatically disabling all rules in the at least one group that are recorded earlier than the latest recorded rule in the group.

9. The method of claim 1, wherein the input elements of the at least one entity and the output elements of the result entity comprises one of run-time elements and element definitions.

10. The method of claim 1, wherein the step of editing the displayed result entity includes one of applying a set of default rules to at least one element of the input entity, specifying a match between elements of the input entities, retracting a match that was found by applying the rule set, adding a desired element to the displayed result entity, deleting an element of the displayed result entity, renaming an element of the displayed result entity, specifying a desired transformation to reconcile input elements, and any combination thereof.

11. A program storage device readable by a machine, tangibly embodying a program of instructions executable by the machine to perform method steps for generating a result entity, the method steps comprising:
receiving as input at least one input entity;
automatically transforming the at least one input entity to a result entity;
displaying the at least one input entity and the result entity;
editing the displayed result entity by accepting at least one user command, if the result entity is not satisfactory to the user, wherein the input entity comprises input elements and the result entity comprises output elements;
selecting, by the user, at least one element of the displayed result entity; and
automatically indicating at least one element of the at least one input entity that corresponds to the at least one element selected by the user.

12. The program storage device of claim 11, wherein the instructions for performing the step of automatically transforming the at least one input entity comprise instructions for performing the step of applying a rule set having at least one composition rule to transform the at least one input entity to the result entity; and wherein the instructions for performing the step of editing the displayed result entity comprise instructions for performing the steps of modifying the rule set based on the user command, and generating and displaying an edited result entity by applying the modified rule set to the at least one input entity.

13. The program storage device of claim 12, further comprising instructions for performing the steps of:
repeating the editing step until the edited result entity is satisfactory to the user; and
saving to memory the modified rule set and associating it with the at least one input entity.

14. The program storage device of claim 13, further comprising instructions for performing the steps of:
retrieving from memory the modified rule set;
applying the modified rule set to a modified version of the at least one input entity;
automatically disabling any rule in the modified rule set that is rendered ineffective due to the modified version of the at least one input entity.

15. The program storage device of claim 12, wherein the instructions for performing the step of modifying the rule set comprise instructions for performing the steps of:
generating at least one composition rule representing the at least one user command; and
incorporating the at least one generated composition rule into the rule set.

16. The program storage device of claim 12, wherein the instructions for performing the step of applying a rule set comprise instructions for performing the step of one of retrieving a previously stored rule set and selecting a default rule set.

17. The program storage device of claim 2, wherein the instructions for performing the step of applying the rule set comprise instructions for performing the steps of:
determining if the rule set includes any disabled rules; and
ignoring the disabled rules during the transform process.

18. The program storage device of claim 12, wherein the instructions for performing the step of applying the rule set comprise instructions for performing the steps of:
determining if the rule set includes at least one group of conflicting rules; and
automatically disabling all rules in the at least one group that are recorded earlier than the latest recorded rule in the group.

19. The program storage device of claim 11, wherein the input elements of the at least one entity and the output elements of the result entity comprises one of run-time elements and element definitions.

20. The program storage device of claim 11, wherein the instructions for performing the step of editing the displayed result entity comprise instructions for one of applying a set of default rules to at least one element of the input entity, specifying a match between elements of the input entities, retracting a match that was found by applying the rule set, adding a desired element to the displayed result entity, deleting an element of the displayed result entity, renaming an element of the displayed result entity, specifying a desired transformation to reconcile input elements, and any combination thereof.

21. A system for generating a result entity, comprising:
   a builder engine for automatically transforming at least one input entity to a result entity; and
   a graphical user interface (GUI) for displaying the at least one input entity and the result entity and editing the displayed result entity by accepting at least one user command, wherein when at least one element of a displayed entity is selected, each corresponding element of the displayed entities is automatically highlighted.

22. The system of claim 21, wherein the builder engine is a matching/reconciliation (MR) engine which is configured for automatically transforming the at least one input entity by applying a rule set having at least one composition rule to transform the at least one input entity to the result entity; and wherein the GUI is configured for editing the displayed result entity by accepting at least one user command that is processed to modify the rule set based on the at least one user command, whereby the MR engine generates an edited result entity by applying the modified rule set to the at least one input entity.

23. The system of claim 22, wherein the input entity comprises input elements and the result entity comprises output elements.

24. The system of claim 23, wherein the at least one user command includes one of applying a set of default rules to at least one element of the input entity, specifying a match between elements of the input entities, retracting a match that was found by applying the rule set, adding a desired element to the displayed result entity, deleting an element of the displayed result entity, renaming an element of the displayed result entity, specifying a desired transformation to reconcile input elements, and any combination thereof.

25. The system of claim 23, wherein the MR engine comprises:
   means for determining if the rule set includes any disabled rules; and
   means for ignoring the disabled rules during the transform process.

26. The system of claim 23, wherein the MR engine comprises:
   means for determining if the rule set includes at least one group of conflicting rules; and
   means for automatically disabling all rules in the at least one group that are recorded earlier than the latest recorded rule in the group.

27. A graphical user interface (GUI) for editing a result entity that is generated by the integration of a plurality of input entities, comprising:
   an input portion for displaying elements of at least one of the input entities;
   an output portion for displaying elements of the result entity; and
   means for selecting, by the user, at least one element of the displayed result entity; and
   means for automatically indicating at least one element of the at least one displayed input entity that corresponds to the at least one selected element of the displayed result entity, whereby a user can edit the selected at least one element of the displayed result entity by selecting at least one user command via the GUI.

28. The GUI of claim 27, further comprising:
   means for selecting, by the user, at least one element of the displayed input entity; and
   means for automatically indicating at least one element of the displayed result entity that corresponds to the at least one input element selected by the user, whereby a user can edit the displayed result entity in accordance with the selected at least one input element by selecting at least one user command via the GUI.

29. The GUI of claim 28, wherein the at least one user command further includes one of applying a set of default rules to the selected at least one element of the input entity, specifying a match between selected elements of displayed input entities, specifying a desired transformation to reconcile selected input elements, retracting a transformation that generated the selected element of the displayed result entity, adding a desired element to the displayed result entity, deleting the selected element of the displayed result entity, renaming the selected element of the displayed result entity, and any combination thereof.

* * * * *